United States Patent
Toida et al.

(10) Patent No.: US 10,923,973 B2
(45) Date of Patent: Feb. 16, 2021

(54) ROTOR FOR ROTATING ELECTRICAL MACHINE

(71) Applicant: KABUSHIKI KAISHA TOYOTA JIDOSHOKKI, Kariya (JP)

(72) Inventors: Naotaka Toida, Kariya (JP); Taizo Kusadome, Kariya (JP); Motoki Shimogawa, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 216 days.

(21) Appl. No.: 15/557,336

(22) PCT Filed: Mar. 8, 2016

(86) PCT No.: PCT/JP2016/057122
§ 371 (c)(1),
(2) Date: Sep. 11, 2017

(87) PCT Pub. No.: WO2016/147945
PCT Pub. Date: Sep. 22, 2016

(65) Prior Publication Data
US 2018/0054098 A1    Feb. 22, 2018

(30) Foreign Application Priority Data
Mar. 16, 2015 (JP) .................. 2015-052304

(51) Int. Cl.
*H02K 1/24* (2006.01)
*H02K 1/27* (2006.01)
(Continued)

(52) U.S. Cl.
CPC ............... *H02K 1/246* (2013.01); *H02K 1/27* (2013.01); *H02K 1/276* (2013.01); *H02K 21/14* (2013.01);
(Continued)

(58) Field of Classification Search
CPC ........... H02K 1/246; H02K 1/27; H02K 1/276
(Continued)

(56) References Cited

U.S. PATENT DOCUMENTS 5,818,140 A * 10/1998 Vagati .................... H02K 1/246
                                                    310/185
6,121,706 A    9/2000 Nashiki et al.
(Continued)

FOREIGN PATENT DOCUMENTS

JP    2000-050546 A    2/2000
JP    2001-359264 A    12/2001
(Continued)

OTHER PUBLICATIONS

International Search Report of PCT/JP2016/057122 dated May 31, 2016 [PCT/ISA/210].
(Continued)

*Primary Examiner* — Nguyen Tran
(74) *Attorney, Agent, or Firm* — Sughrue Mion, PLLC (57) ABSTRACT

A rotor for a rotating electrical machine includes a cylindrical rotor core configured to be arranged radially inside of a stator with a coil wound therearound. An outer circumferential surface of the rotor core is opposed to the stator with a gap therebetween. The rotor core has a plurality of magnetic pole regions in a circumferential direction and also has, in each of the magnetic pole regions, a flux barrier extending along q-axis magnetic paths. An inner wall of the flux barrier has a radially outer wall surface and a radially inner wall surface. The radially inner wall surface is broadened to be closer to the adjacent magnetic pole region than a position along the q-axis magnetic paths.

7 Claims, 9 Drawing Sheets

(51) Int. Cl.
  *H02K 29/03* (2006.01)
  *H02K 21/14* (2006.01)
(52) U.S. Cl.
  CPC ......... *H02K 29/03* (2013.01); *H02K 2201/03* (2013.01); *H02K 2213/03* (2013.01)
(58) Field of Classification Search
  USPC ..................... 310/156.53, 216.106, 216.107
  See application file for complete search history.

(56) References Cited

U.S. PATENT DOCUMENTS

| | | | | |
|---|---|---|---|---|
| 2005/0269888 | A1* | 12/2005 | Utaka | H02K 1/276 310/156.53 |
| 2010/0150750 | A1* | 6/2010 | Oh | H02K 1/276 417/410.1 |
| 2012/0187877 | A1 | 7/2012 | Yamagiwa et al. | |
| 2014/0346911 | A1 | 11/2014 | Tsuchida et al. | |
| 2015/0295459 | A1* | 10/2015 | Hao | B60K 6/48 180/65.26 |
| 2015/0303748 | A1* | 10/2015 | Kolehmainen | H02K 1/246 310/216.107 |
| 2016/0141926 | A1* | 5/2016 | Kano | H02K 1/2766 310/156.53 |

FOREIGN PATENT DOCUMENTS

| | | |
|---|---|---|
| JP | 2002-369424 A | 12/2002 |
| JP | 2003-264947 A | 9/2003 |
| JP | 2005-341655 A | 12/2005 |
| JP | 2011-229395 A | 11/2011 |
| JP | 2013-179765 A | 9/2013 |
| WO | 2011040020 A1 | 4/2011 |
| WO | 2011125308 A1 | 10/2011 |

OTHER PUBLICATIONS

International Preliminary Report on Patentability with translation of Written Opinion dated Sep. 19, 2017, issued by the International Searching Authority in application No. PCT/JP2016/057122.
Communication dated Feb. 23, 2018 from the European Patent Office in counterpart EP application No. 16764775.9.
Communication dated May 22, 2019, from the European Patent Office in counterpart European Application No. 16764775.9.
Communication dated Jan. 30, 2020, from the European Patent Office in Application No. 16746775.9.

* cited by examiner

ROTOR FOR ROTATING ELECTRICAL MACHINE

CROSS REFERENCE TO RELATED APPLICATIONS

This application is a National Stage of International Application No. PCT/JP2016/057122, filed Mar. 8, 2016, claiming priority based on Japanese Patent Application No. 2015-052304, filed Mar. 16, 2015, the contents of all of which are incorporated herein by reference in their entirety.

TECHNICAL FIELD

The present invention relates to a rotor for a rotating electrical machine.

BACKGROUND ART

Figure 14:
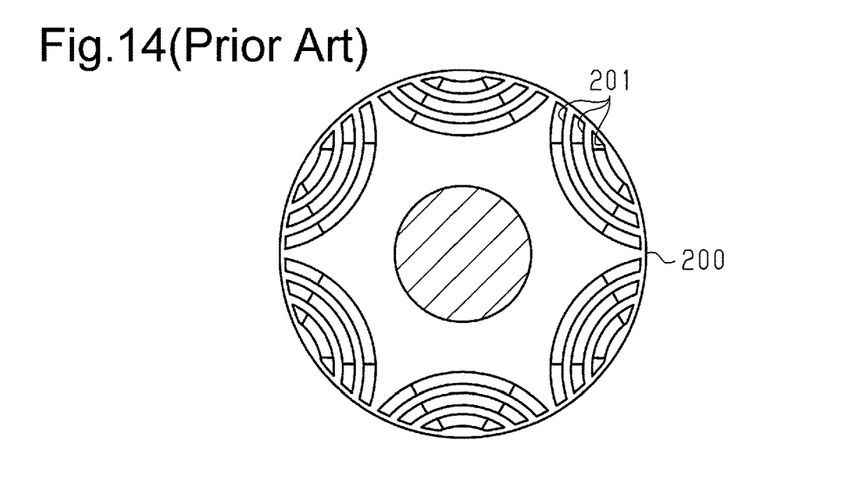
FIG. 14 illustrates a background art.

Rotors for rotating electrical machines with arcuate flux barriers formed in a rotor core have been known (see Patent Document 1, for example). In the motor disclosed in Patent Document 1, arcuate slots are provided in a rotor core, as shown in FIG. 14 of the present disclosure where arcuate slots 201 are provided in a rotor core 200, to increase the saliency ratio (Lq/Ld) and therefore to increase the reluctance torque.

PRIOR ART DOCUMENT

Patent Document

Patent Document 1: Japanese Laid-Open Patent Publication No. 2013-179765

SUMMARY OF THE INVENTION

Problems that the Invention is to Solve

There is a need for more effective use of a rotor core to further increase the reluctance torque.

Accordingly, It is an objective of the present invention to provide a rotor for a rotating electrical machine is capable of increasing the saliency ratio.

Means for Solving the Problems

To achieve the foregoing objective and in accordance with one aspect of the present invention, a rotor for a rotating electrical machine is provided that includes a cylindrical rotor core configured to be arranged radially inside of a stator with a coil wound therearound. An outer circumferential surface of the rotor core is opposed to the stator with a gap therebetween. The rotor core has a plurality of magnetic pole regions in a circumferential direction and also has, in each of the magnetic pole regions, a flux barrier extending along a q-axis magnetic path. An inner wall of the flux barrier has a radially outer wall surface and a radially inner wall surface. The radially inner wall surface is broadened to be closer to the adjacent magnetic pole region than a position along the q-axis magnetic path.

With the configuration above, the flux barrier extends along the q-axis magnetic path in the rotor core and the radially inner wall surface of the flux barrier broadened to be closer to the adjacent magnetic pole region than the position along the q-axis magnetic path. Thus, the d-axis inductance Ld is reduced with a limited change in the q-axis inductance Lq, so that the saliency ratio (Lq/Ld) is increased.

Effects of the Invention

In accordance with the present invention, the saliency ratio can be increased.

MODES FOR CARRYING OUT THE INVENTION

One embodiment of the present invention will now be described with reference to the drawings.

Figure 1:
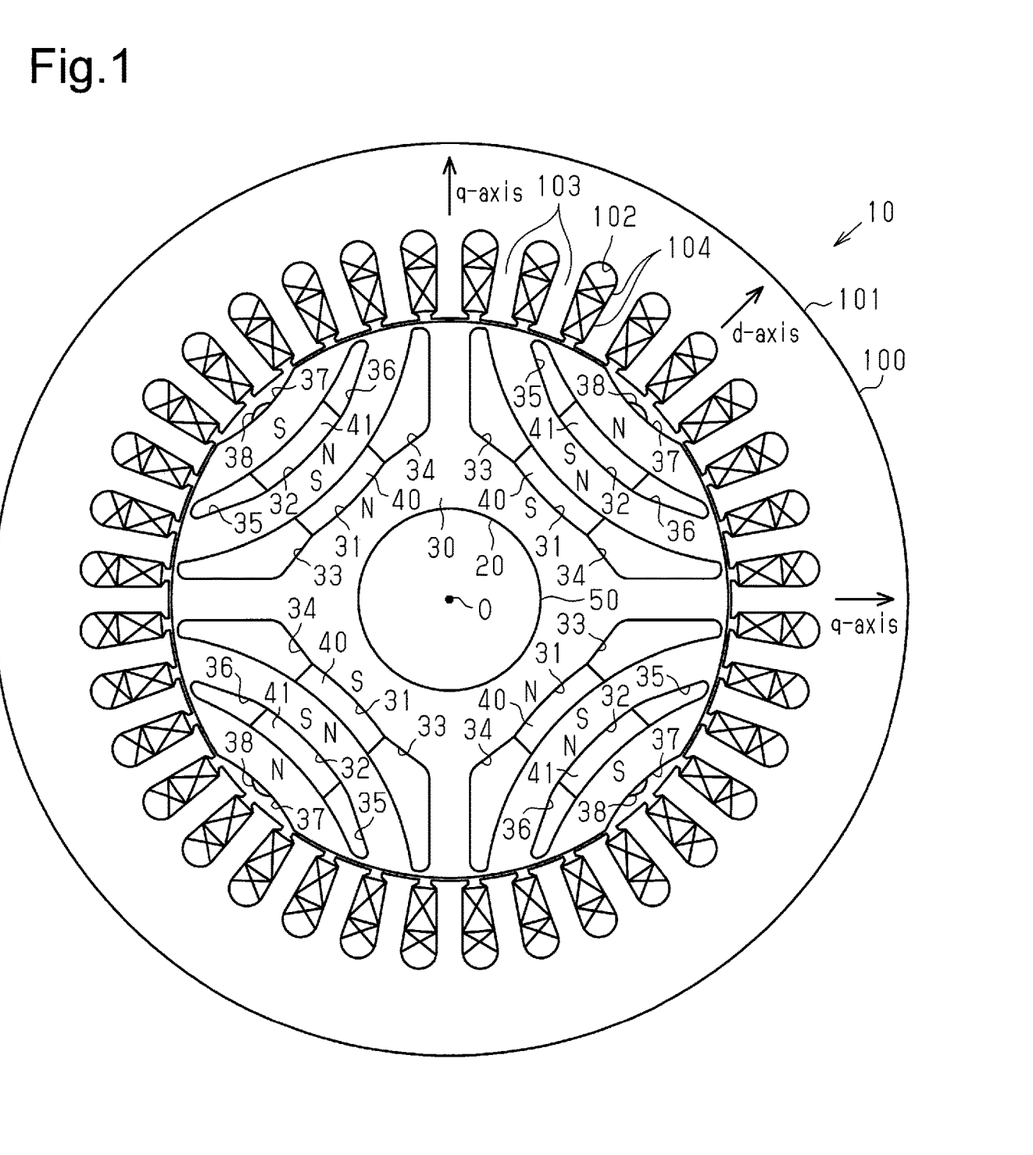
FIG. 1 is a schematic diagram of a rotating electrical machine according to one embodiment.

As shown in FIG. 1, a rotating electrical machine 10 is a magnet embedded rotating electrical machine including a rotor 20 and a stator 100. The stator 100 is arranged on the radially outer side of the cylindrical rotor 20. The inner circumferential surface of the stator 100 is opposed to the outer circumferential surface of the rotor 20 with a gap G therebetween (see FIG. 2A). All the drawings are schematic to exaggerate the geometry. The number of poles of the rotating electrical machine 10 according to the present embodiment is four.

Figure 2A:
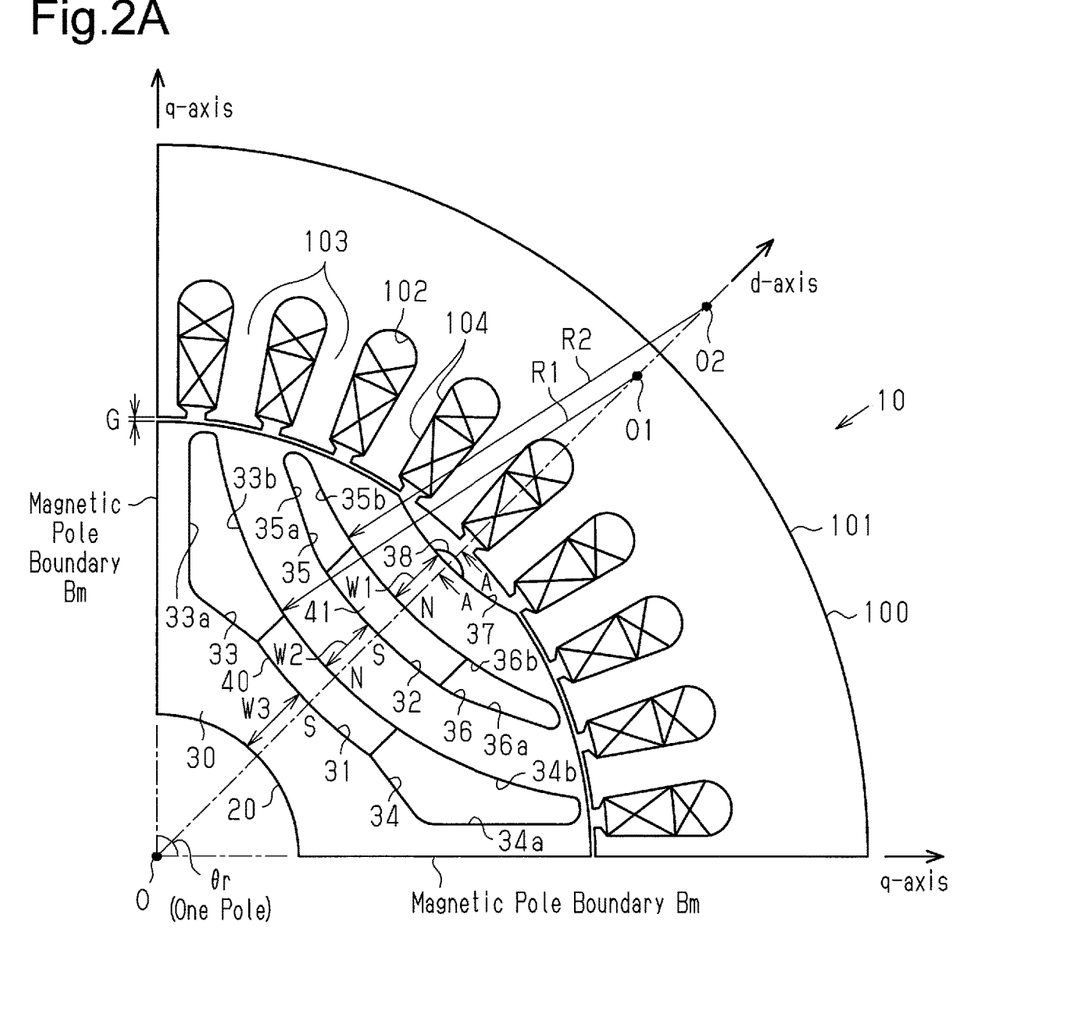
FIG. 2A is a partially enlarged view of the rotating electrical machine according to the embodiment.

As shown in FIGS. 1 and 2A, the stator 100 has a cylindrical stator core 101, and a plurality of (thirty-six in the present embodiment) slots 102 are provided in the circumferential direction on the inner side of the stator core 101. Each slot 102 is opened through the inner circumferential surface of the stator core 101. Teeth 103 are provided between circumferentially adjacent ones of the slots 102. In the stator 100 of the present embodiment, the number of slots per pole is nine (i.e. the number of teeth per pole is nine), and the angle θr per pole around the center O is 90 degrees. A coil 104, through which a three-phase alternating current flows, is wound around the teeth 103, which are provided at regular intervals in the circumferential direction. The coil 104 is arranged in an inner peripheral portion of the stator 100.

The rotor 20 is arranged radially inside of the stator 100 and includes a cylindrical rotor core 30 constituted by stacking a plurality of (e.g. tens of) substantially disk-shaped magnetic steel plates. A shaft 50 is inserted into the center of the rotor core 30. The rotor 20 is supported on a bearing of a housing (not shown) via the shaft 50, with a predetermined spacing between the outer circumferential surface of the rotor core 30 and the teeth 103, so as to be rotational with respect to the housing. That is, the rotor 20 is arranged such that the outer circumferential surface of the rotor core 30 is opposed to the inner circumferential surface of the stator 100 with a gap G therebetween.

The rotor 20 has four magnetic pole regions in the circumferential direction. The angle θr of each magnetic pole region is 90 degrees. In the rotor core 30, a plurality of permanent magnets 40, 41 is embedded to be arranged in the radial direction in each magnetic pole region. In the present embodiment, two permanent magnets 40, 41 are provided in each magnetic pole region. Flux barriers 33, 34, 35, 36 are arranged on either side of the permanent magnets 40, 41 in the circumferential direction. Specifically, arcuate permanent magnet insertion holes 31, 32 are provided in each magnetic pole region of the rotor core 30. The permanent magnet insertion holes 31, 32 extend in the axial direction of the rotor core 30. The permanent magnet insertion hole 31 is located radially inward, while the permanent magnet insertion hole 32 is located radially outward. The arcuate permanent magnet 40 is inserted into the arcuate permanent magnet insertion hole 31. The permanent magnet 40 is located on the d-axis and magnetized in its thickness direction (in the radial direction of the rotor core 30). The arcuate permanent magnet 41 is inserted into the arcuate permanent magnet insertion hole 32. The permanent magnet 41 is located on the d-axis and magnetized in its thickness direction (in the radial direction of the rotor core 30).

As shown in FIG. 1, the permanent magnets 40 and 41 are arranged such that adjacent ones of the magnetic pole regions have different polarities. For example, if the permanent magnets 40, 41 in one of the magnetic pole regions are arranged such that the polarity opposed to the teeth 103 is a south pole, the permanent magnets 40, 41 in the adjacent magnetic pole regions are arranged such that the polarity opposed to the teeth 103 is a north pole.

The rotor core 30 has arcuate flux barriers 33, 34 continuing and extending from the respective circumferential ends of the permanent magnet insertion hole 31. Similarly, the rotor core 30 has arcuate flux barriers 35, 36 continuing and extending from the respective circumferential ends of the permanent magnet insertion hole 32. The flux barriers 33, 34, 35, 36 are each constituted by a hole or slit extending in the axial direction of the rotor core 30.

Figure 3:
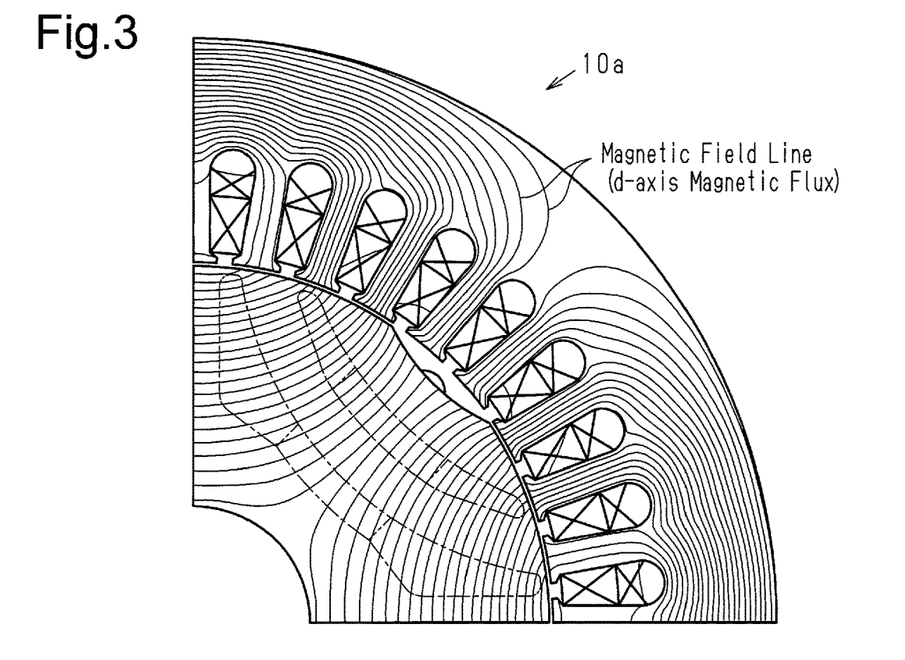
FIG. 3 shows d-axis magnetic flux in an exemplary rotating electrical machine.
Figure 4:
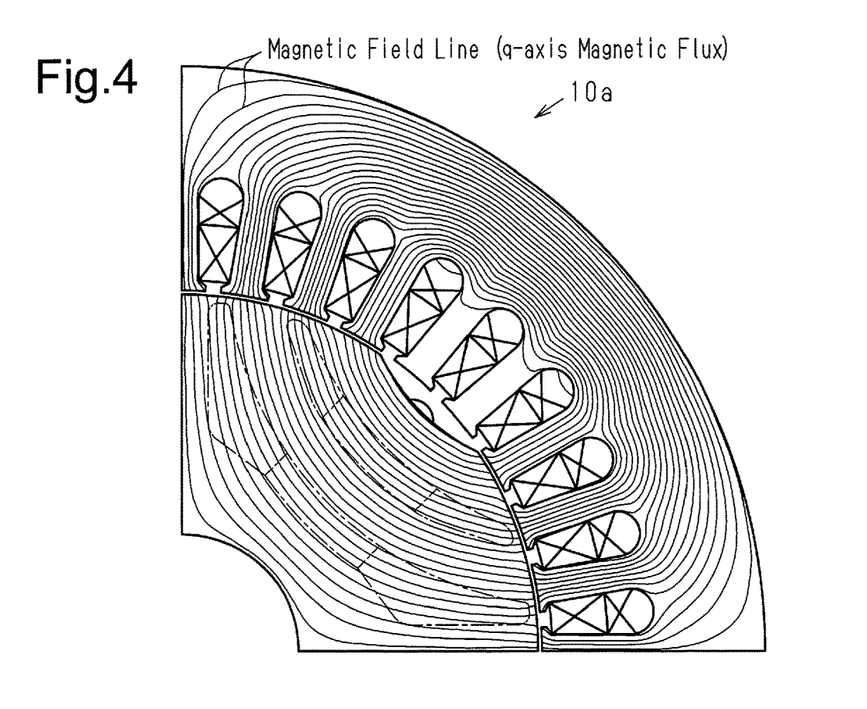
FIG. 4 shows q-axis magnetic flux in an exemplary rotating electrical machine.

FIGS. 3 and 4 exemplify magnetic flux in an exemplary rotating electrical machine 10*a*. FIG. 3 visualizes d-axis magnetic flux. FIG. 4 visualizes q-axis magnetic flux. While FIGS. 3 and 4 show magnetic flux generated in the coil 104 when the permanent magnet insertion holes 31, 32, the flux barriers 33 to 36, and the permanent magnets 40, 41 are omitted, the arrangements of the permanent magnet insertion holes 31, 32, the flux barriers 33 to 36, and the permanent magnets 40, 41 in the present embodiment are indicated by the long dashed short dashed lines for reference.

As shown in FIG. 2A, in the present embodiment, the flux barriers 33, 34 extend along the q-axis magnetic paths (see FIG. 4). In the present embodiment, the flux barriers 35, 36 extend along the q-axis magnetic path (see FIG. 4). The flux barriers 33, 34 are located radially inward, while the flux barriers 35, 36 are located radially outward, the rotor core 30 thus has a plurality of flux barrier layers arranged in the radial direction. The flux barriers 33, 34 located radially inward and the flux barriers 35, 36 located radially outward will hereinafter be referred to, respectively, as an inner flux barrier layer and an outer flux barrier layer, respectively.

The inside wall of the flux barrier 33, in other words, the inside wall of the slit (hole) constituting the flux barrier 33 has a radially inner wall surface 33*a* as well as a radially outer wall surface 33*b*. The radially outer wall surface 33*b* has an arcuate shape. The inside wall of the flux barrier 34, in other words, the inside wall of the slit (hole) constituting the flux barrier 34 has a radially inner wall surface 34*a* as well as a radially outer wall surface 34*b*. The radially outer wall surface 34*b* has an arcuate shape.

The inside wall of the flux barrier 35, in other words, the inside wall of the slit (hole) constituting the flux barrier 35 has a radially inner wall surface 35*a* as well as a radially outer wall surface 35*b*. The radially outer wall surface 35*b* has an arcuate shape, while the radially inner wall surface 35*a* extends substantially linearly. The inside wall of the flux barrier 36, in other words, the inside wall of the slit (hole) constituting the flux barrier 36 has a radially inner wall surface 36*a* as well as a radially outer wall surface 36*b*. The radially outer wall surface 36*b* has an arcuate shape, while the radially inner wall surface 36*a* extends substantially linearly.

The center O1 of the arc including the arcuate inside wall surface on the radially outer side of the permanent magnet insertion hole 31 and the radially outer wall surfaces 33*b*, 34*b* of the flux barriers 33, 34 is located radially outside of the outer circumferential surface of the rotor core 30. The center O2 of the arc including the arcuate inside wall surface on the radially outer side of the permanent magnet insertion hole 32 and the radially outer wall surfaces 35*b*, 36*b* of the flux barriers 35, 36 is located radially outside of the outer circumferential surface of the rotor core 30. The center O1 of the arc and the center O2 of the arc are located on the d-axis.

The flux barriers 33, 34 are located at the radially innermost positions among the flux barriers 33, 34 and 35, 36. The radially inner wall surfaces 33*a*, 34*a* of the flux barriers 33, 34 are broadened (flared) to be closer to the adjacent magnetic pole regions than the positions along the q-axis magnetic path. More specifically, the radially inner wall surfaces 33*a*, 34*a* are maximally broadened toward the adjacent magnetic pole regions and thereby have portions in parallel with the boundaries Bm between the magnetic pole regions to ensure a magnetic path width sufficient so as not to saturate the magnetic flux density.

Figure 2B:
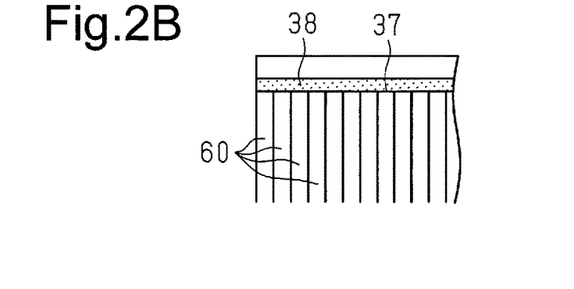
FIG. 2B is a schematic cross-sectional view taken along line A-A in FIG. 2A.

As shown in FIG. 2A, the rotor core 30 has a cutout (recess) 37 in each portion of the outer circumferential surface through which the d-axis extends. The cutouts (recess) 37 extend in the axial direction of the rotor core 30. One cutout (recess) 37 is provided for each pole to be symmetrical with respect to the d-axis. The cutout 37 also has an arcuate bottom surface portion in a cross-section orthogonal to the axis of the rotor core 30. As shown in FIG. 2B, the bottom surface portion of the cutout 37 has a welded portion 38 to join the magnetic steel plates 60 stacked to form the rotor core 30. Specifically, the magnetic steel plates 60 are TIG-welded. The welded portion 38, through which magnetic flux is less likely to flow due to degradation, does not affect the magnetic performance of the rotating electrical machine 10, even if it is provided on the cutout 37.

Figure 5:
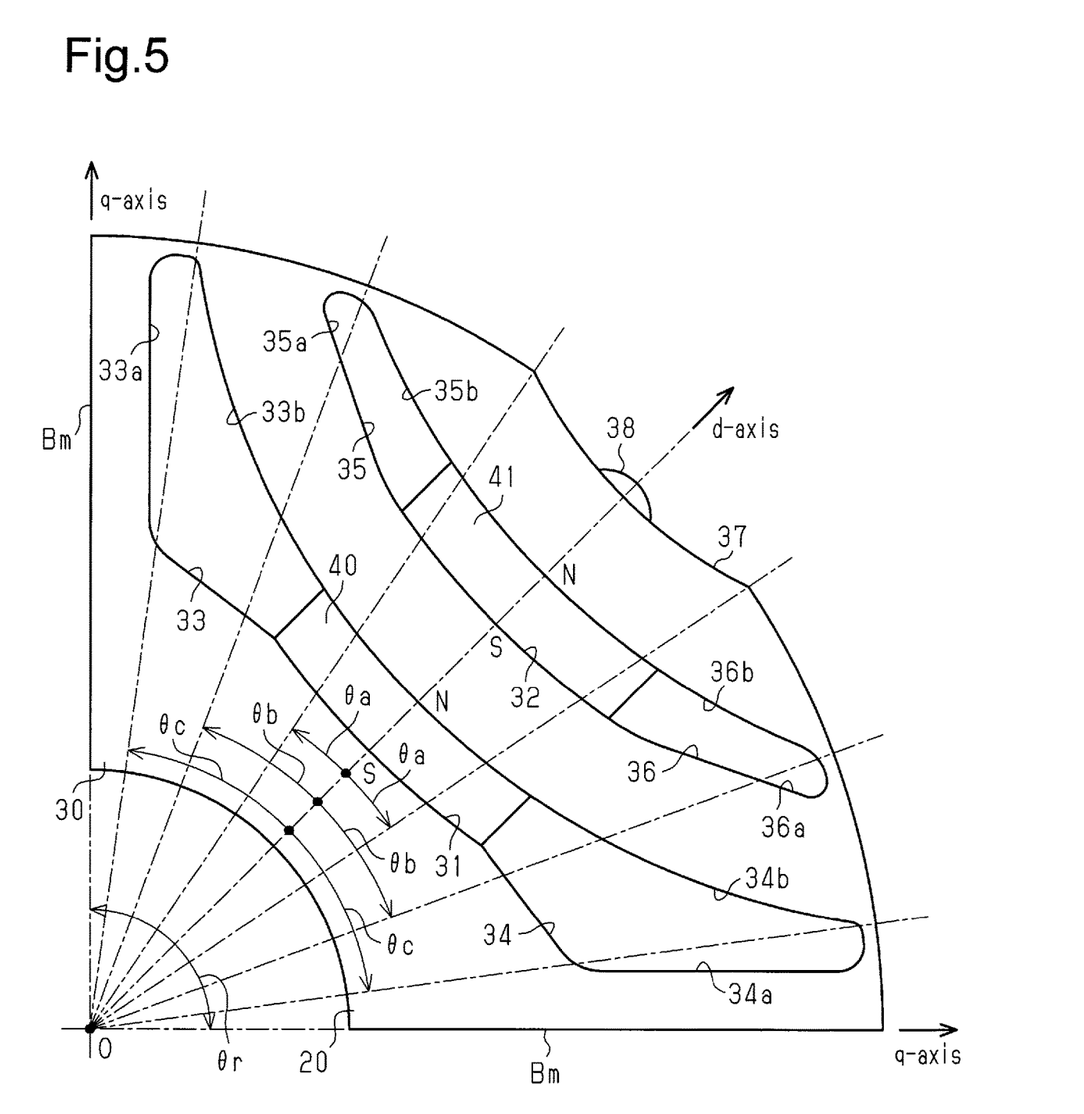
FIG. 5 is a partially enlarged view of a rotor according to the embodiment.

As shown in FIG. 5, the rotor core 30 of the present embodiment is designed such that the flux barriers 33 to 36 and the cutout 37 are arranged at optimal positions.

Specifically, the flux barriers 33, 34, 35, 36 are included in the inner flux barrier layer (33, 34) arranged radially inward and the outer flux barrier layer (35, 36) arranged to be separated radially outward from the inner flux barrier layer (33, 34). The inner flux barrier layer (33, 34) and the outer flux barrier layer (35, 36) each have a shape symmetrical with respect to the d-axis. The rotor core 30 also has the cutout 37 in a portion of the outer circumferential surface of the rotor core 30 through which the d-axis extends. The cutout 37 extends in the axial direction of the rotor core 30 and is symmetrical with respect to the d-axis. The angle of the rotor core 30 of each pole (the angle of each magnetic pole region) is represented by θr. The angle between the d-axis and one of the circumferential ends of the cutout 37 is represented by θa. The angle between the d-axis and the circumferential ends (corners) of the radially outer wall surfaces 35b, 36b of the outer flux barrier layer (35, 36) is represented by θb. The angle between the d-axis and the circumferential ends (corners) of the radially outer wall surfaces 33b, 34b of the inner flux barrier layer (33, 34) is represented by θc. The values θa/θr, θb/θr, and θc/θr satisfy the following expressions (1), (2), and (3).

$$0.12 \leq \theta a/\theta r \leq 0.14 \quad (1)$$

$$0.26 \leq \theta b/\theta r \leq 0.29 \quad (2)$$

$$0.40 \leq \theta c/\theta r \leq 0.42 \quad (3)$$

Next, an operation of the thus configured rotating electrical machine 10 will be described.

When the rotating electrical machine 10 is driven, a three-phase current is supplied to the coil 104 of the stator 100, so that a rotating magnetic field is generated in the stator 100 to act on the rotor 20. The magnetic attractive force and repulsive force between the rotating magnetic field and the permanent magnets 40, 41 then cause the rotor 20 to rotate synchronously with the rotating magnetic field.

Next, the d-axis inductance Ld, q-axis inductance Lq, and reluctance torque will be described with reference to FIGS. 6 and 7. A rotor 120 of a comparative example shown in FIG. 11 and the rotor 20 of the present embodiment shown in, for example, FIG. 2A will be compared.

Figure 11:
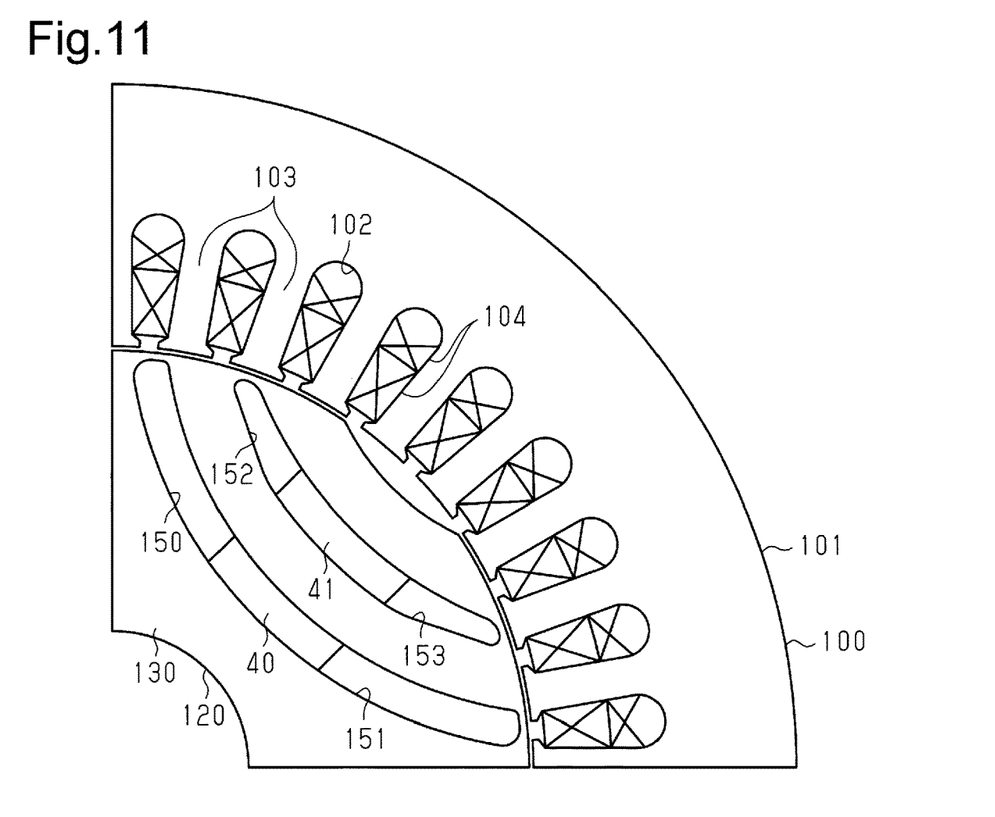
FIG. 11 is a partially enlarged view of a rotating electrical machine according to the comparative example.

In the comparative example of FIG. 11, the rotor core 130 has arcuate flux barriers 150, 151, 152, 153 extending along the q-axis magnetic path. In contrast, in the rotor core 30 of the present embodiment, the radially inner wall surfaces 33a, 34a in the inner flux barrier layers 33, 34 are broadened to be closer to the adjacent magnetic pole regions than the positions along the q-axis magnetic path, as shown in FIG. 2A.

Figure 6:
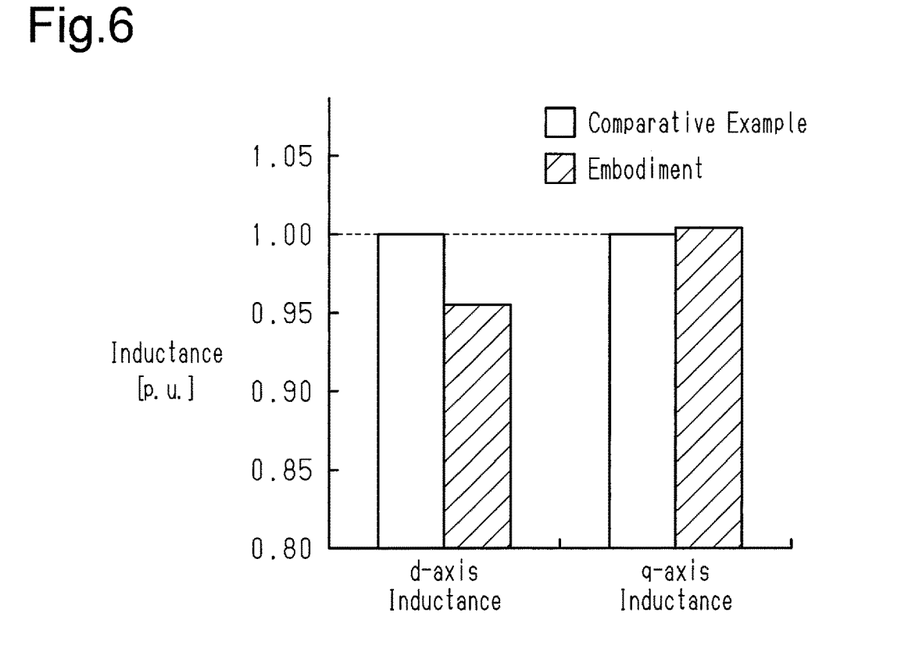
FIG. 6 shows analysis results of the d-axis inductance and the q-axis inductance in the embodiment and a comparative example.

In FIG. 6, analysis results of the d-axis inductance of the rotor 20 of the present embodiment and the rotor 120 of the comparative example are shown with the comparative example set to 1.00. The d-axis inductance of the rotor 20 of the present embodiment is reduced significantly to 0.95 compared to the d-axis inductance of the rotor 120 of the comparative example.

In FIG. 6, analysis results of the q-axis inductance of the rotor 20 of the present embodiment and the rotor 120 of the comparative example are also shown with the comparative example set to 1.00. The q-axis inductance of the rotor 20 of the present embodiment is substantially equal to the q-axis inductance of the rotor 120 of the comparative example.

Figure 7:
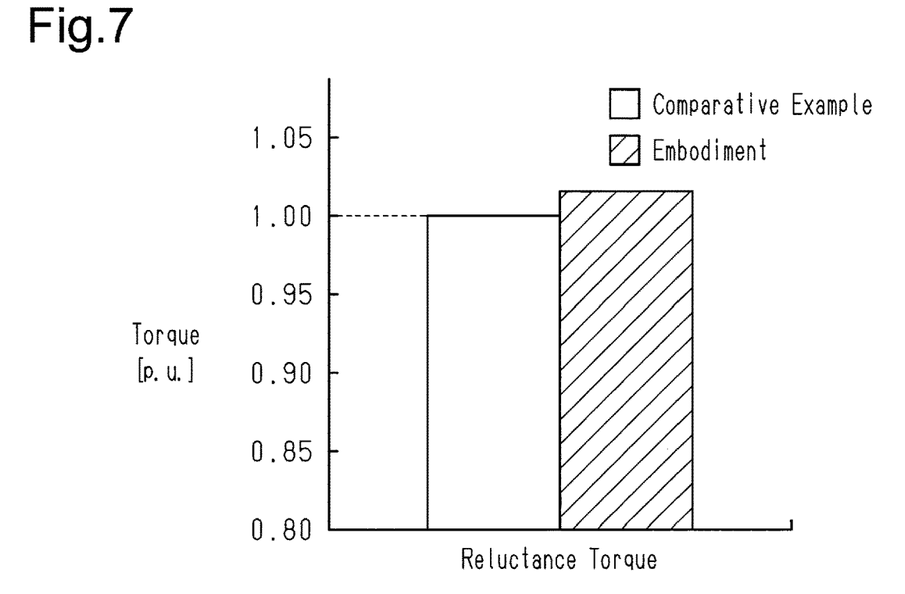
FIG. 7 shows analysis results of the reluctance torque in the embodiment and the comparative example.

In FIG. 7, analysis results of the reluctance torque of the rotor 20 of the present embodiment and the rotor 120 of the comparative example are shown with the comparative example set to 1.00. The reluctance torque of the rotor 20 of the present embodiment is increased to approximately 1.02 compared to the reluctance torque of the rotor 120 of the comparative example.

As shown in FIG. 6, the present embodiment thus undergoes only a small change in the q-axis inductance, while undergoing a reduction in the d-axis inductance compared to the comparative example. As a result, the present embodiment undergoes an increase in the reluctance torque compared to the comparative example, as shown in FIG. 7.

The rotor 20 of the present embodiment shown in FIG. 2A differs from the rotor 120 of the comparative example shown in FIG. 11 only in the shape of the flux barriers. This allows for an increase in the reluctance torque with a limited increase in the costs. Also, the flux barriers in the rotor 20 of the present embodiment are made broader than those in the comparative example, allowing for weight saving.

Figure 12:
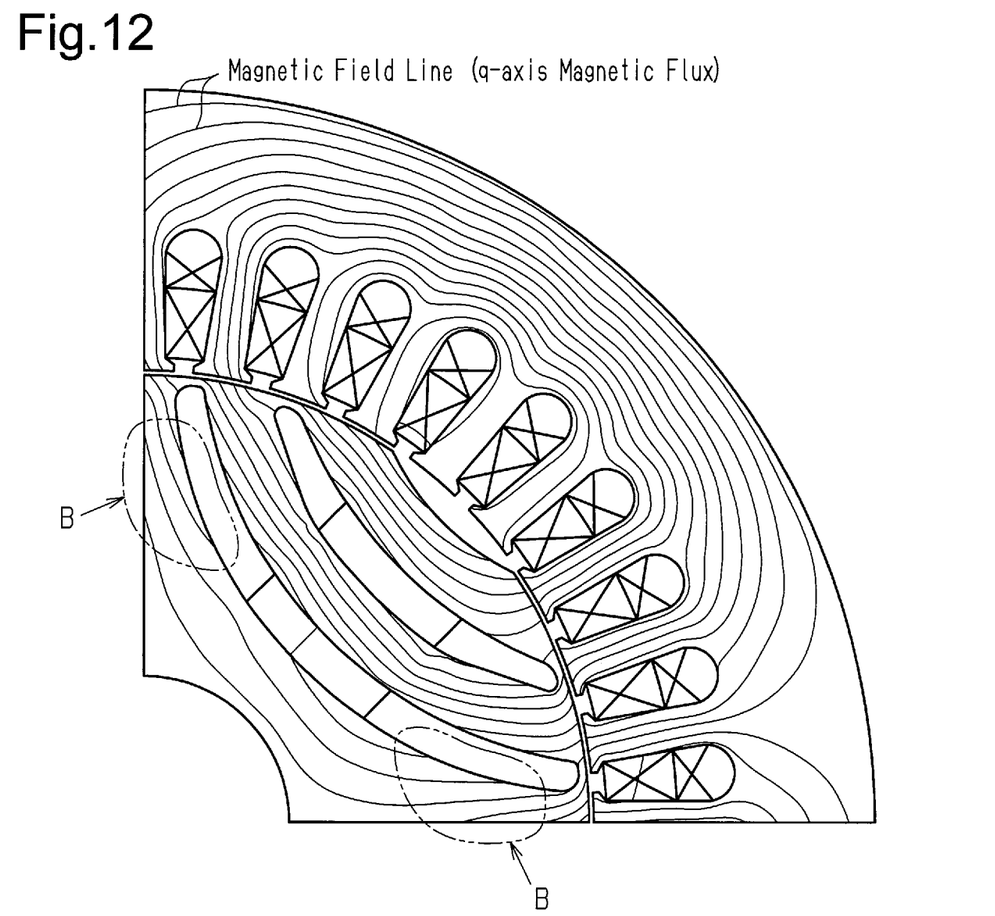
FIG. 12 is a partially enlarged view of the rotating electrical machine shown in FIG. 11, showing magnetic flux.

FIG. 12 visualizes magnetic flux in the rotor 120 of the comparative example shown in FIG. 11 when the rotor 120 is in the advanced state with the maximum torque. In such a rotor 120 as shown in FIG. 11, the site indicated by B in FIG. 12 has a relatively low magnetic flux density. Accordingly, even if this site has a narrowed magnetic path, the q-axis inductance Lq undergoes only a small change. In the present embodiment, the flux barriers 33, 34 employ a shape with which the magnetic path width can be reduced to the extent not to saturate the magnetic flux density to have an increased width in the direction along the d-axis magnetic path, as shown in FIG. 2A. This allows the flux barriers 33, 34 of the present embodiment to have a shape to block the d-axis magnetic flux shown in FIG. 3. As a result, the d-axis inductance Ld is reduced, so that the saliency ratio (Lq/Ld) is increased.

Thus devising the shape in the site with a relatively low magnetic flux density (indicated by B in FIG. 12) allows the d-axis inductance Ld to be reduced with a limited change in the q-axis inductance Lq, so that the saliency ratio (Lq/Ld) and therefore the reluctance torque can be increased.

Also, the rotor core 30 has the cutout 37 in the outer circumferential surface thereof, and the magnetic steel plates 60 stacked to constitute the rotor core 30 are joined at the cutout 37 by welding.

For example, if a configuration for fixation between the magnetic steel plates were employed in which a swaged portion is provided within the steel plates and the steel plates are sandwiched between retainer plates, the swaged portion would be required to be arranged within the magnetic path in the rotor core. The swaged portion would then distort the steel plates and worsen the magnetic performance of the steel plates. As a result, the torque of the rotating electrical machine may, for example, be reduced depending on the arrangement of a swaged portion. In the present embodiment, there is no need to arrange such a swaged portion within the magnetic path in the rotor core 30 for fixation between the magnetic steel plates 60, so that the torque of the rotating electrical machine 10 is not reduced.

In the present embodiment, the cutout (large groove) 37 is provided on the outer circumferential surface of the rotor core 30 and the cutout (space) 37 is utilized for fixation between the magnetic steel plates 60 by welding. Since the cutout (sufficiently large outer peripheral groove) 37 is provided in the rotor core 30, the welded portion 38 does not protrude from the outer circumferential surface of the rotor core 30, so that the welded portion 38 does not come into contact with the stator 100 and the rotor 20 is not increased in size. The welded portion 38 is provided at one site within the cutout 37, but may be provided at two or more sites. For example, two welded portions 38 may be provided within one cutout 37. A welding method other than TIG-welding, such as laser welding, may also be used.

Figure 8:
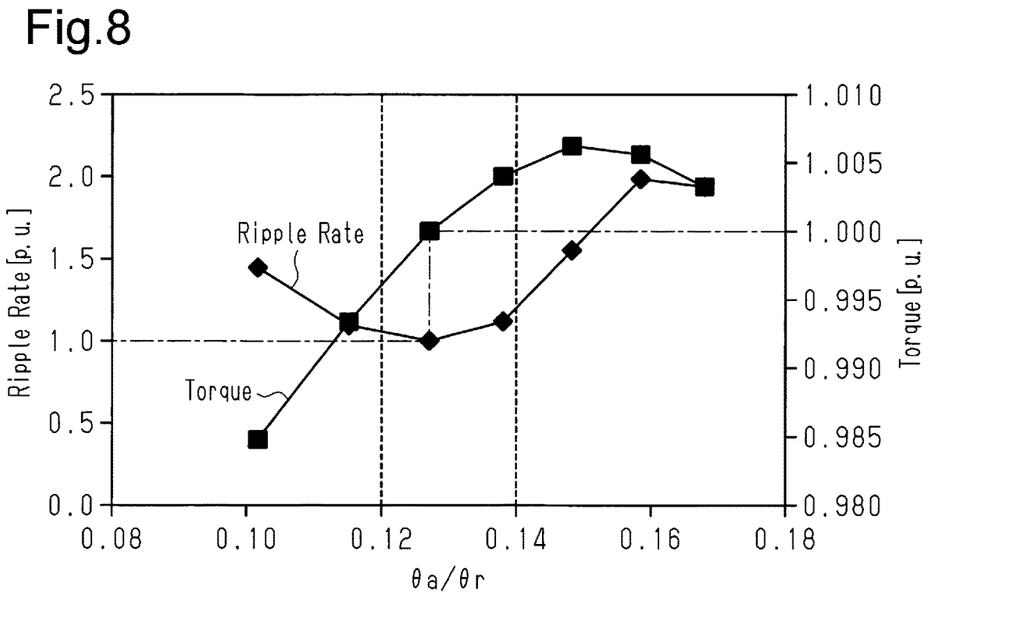
FIG. 8 shows analysis results of the ripple rate and the torque for the angular ratio ($\theta a/\theta r$) shown in FIG. 5.
Figure 9:
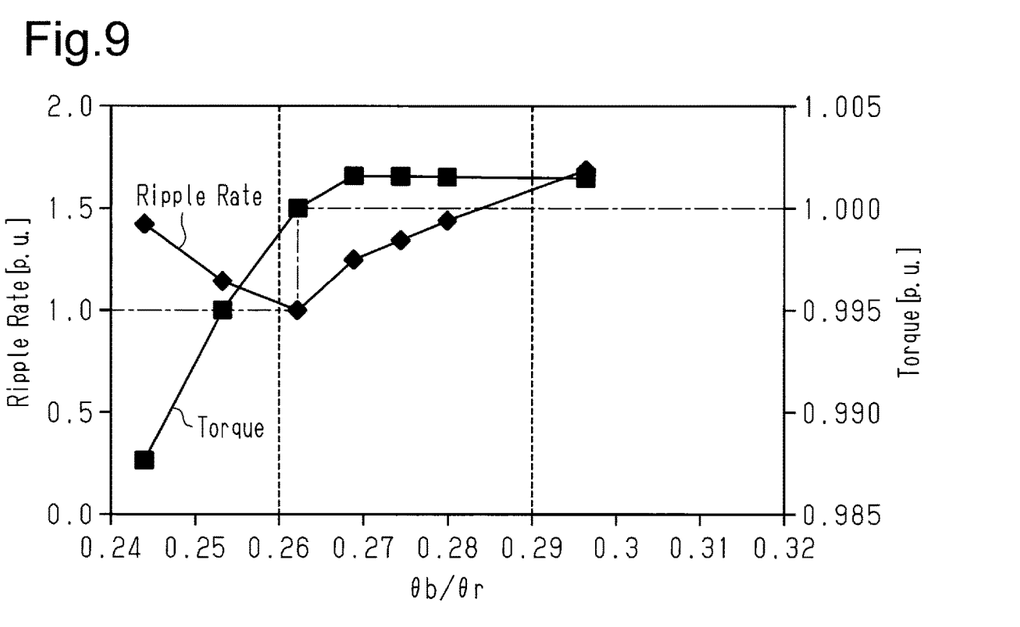
FIG. 9 shows analysis results of the ripple rate and the torque for the angular ratio ($\theta b/\theta r$) shown in FIG. 5.
Figure 10:
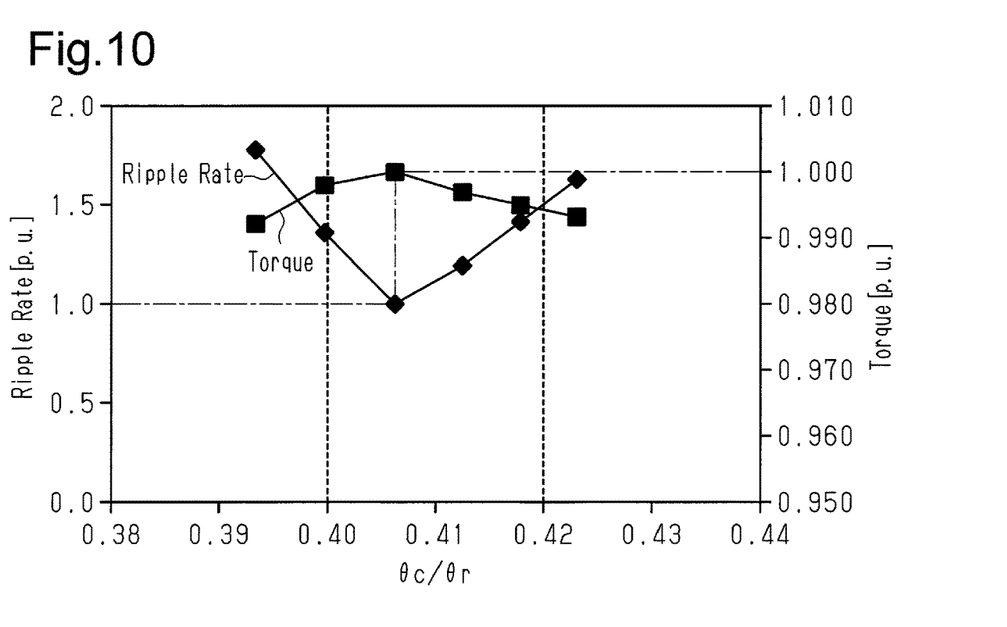
FIG. 10 shows analysis results of the ripple rate and the torque for the angular ratio ($\theta c/\theta r$) shown in FIG. 5.

FIGS. 8, 9, and 10 show analysis results of the torque ripple and the torque of the rotating electrical machine 10 when the angles of arrangement θa, θb, θc of the flux barriers 33 to 36 and the cutout 37 of the present embodiment (see FIG. 5) are changed with respect to the angle θr of each magnetic pole region.

In FIG. 8, the horizontal axis represents θa/θr, while the vertical axis represents the ripple rate and the torque. In FIG. 9, the horizontal axis represents θb/θr, while the vertical axis represents the ripple rate and the torque. In FIG. 10, the horizontal axis represents θc/θr, while the vertical axis represents the ripple rate and the torque.

Regarding the ripple rate, the minimum value is normalized to 1.0. Regarding the torque, when the ripple rate is the minimum value, 1.0 is normalized.

As shown in FIG. 8, the ripple rate is minimum when θa/θr is approximately 0.127. The ripple rate increases when θa/θr becomes lower or higher than approximately 0.127. Also, as shown in FIG. 8, the torque increases with the increase in θa/θr up to approximately 0.148. In view of this, θa/θr is preferably within the range of 0.12 θa/θr≤0.14 to reduce the ripple rate with a limited reduction in the torque. If θa/θr is, for example, approximately 0.115, the torque ripple is low but the torque is also significantly low, where θa/θr is not within the preferable range.

As shown in FIG. 9, the ripple rate is minimum when θb/θr is approximately 0.262. The ripple rate increases when θb/θr becomes lower or higher than approximately 0.262. As shown in FIG. 9, the torque is maximum when θb/θr is approximately 0.269. The torque rapidly becomes lower when θb/θr becomes lower than approximately 0.269, while the torque moderately becomes lower when θb/θr becomes higher than approximately 0.269. In view of this, θb/θr is preferably within the range of 0.26 θb/θr≤0.29 to reduce the ripple rate with a limited reduction in the torque.

As shown in FIG. 10, the ripple rate is minimum when θc/θr is approximately 0.406. The ripple rate increases when θc/θr becomes lower or higher than approximately 0.406. As shown in FIG. 10, the torque is maximum when θc/θr is approximately 0.406. The torque becomes lower when θc/θr becomes lower or higher than approximately 0.406. In view of this, θc/θr is preferably within the range of 0.40≤θc/θr≤0.42 to reduce the ripple rate with a limited reduction in the torque.

FIGS. 8, 9, and 10 thus show that the torque ripple is low with a limited reduction in the torque when θa/θr, θb/θr, θc/θr are within the ranges expressed by the expressions (1), (2), and (3) above. The torque ripple can thus be low with a limited reduction in the reluctance torque by arranging the flux barriers 33 to 36 and the cutout 37 so as to satisfy the expressions (1), (2), and (3) above.

This will be described in more detail. For example, providing a cutout in the outer circumferential surface of the rotor core on the q-axis to reduce the torque ripple would result in a reduction in the torque of the rotating electrical machine 10 due to reduction in the reluctance torque. That is, providing a non-magnetic portion such as a cutout on the q-axis magnetic path in the rotor core would worsen the flow of q-axis magnetic flux and thereby reduce the q-axis inductance Lq, and therefore result in a reduction in the reluctance torque.

In contrast, in FIG. 5, the flux barriers 33, 34, 35, 36 are provided as two inverted-arcuate layers (centering on O1, O2 shown in FIG. 2A) in each magnetic pole region and the cutout 37 is provided on the outer circumferential surface of the rotor core 30 on the d-axis so that the torque ripple becomes low with a limited reduction in the reluctance torque. The rotor core 30 is also configured to satisfy the expressions (1), (2), and (3) above.

Accordingly, since no cutout is provided in the outer circumferential surface of the rotor core 30 on the q-axis, the reluctance torque can be prevented from lowering and the torque ripple can be reduced significantly by optimally arranging the flux barriers 33, 34, 35, 36 and the cutout 37 on the d-axis. The cutout 37 in the outer circumferential surface of the rotor core on the d-axis also exhibits an effect of an increase in the reluctance torque.

The above-described embodiment achieves the following advantages.

(1) The rotor 20 for the rotating electrical machine 10 has the cylindrical rotor core 30 configured to be arranged radially inside of the stator 100 with the coil 104 wound therearound. The outer circumferential surface of the rotor core 30 is opposed to the stator 100 with the gap G therebetween. The rotor core 30 has magnetic pole regions in the circumferential direction and also has, in each of the magnetic pole regions, the flux barriers 33, 34 extending along the q-axis magnetic path. The inside walls of the flux barriers 33, 34 have the radially inner wall surfaces 33a, 34a, and the radially inner wall surfaces 33a, 34a, which are broadened to be closer to the adjacent magnetic pole regions than the positions along the q-axis magnetic path. As described with reference to FIG. 12, the rotor core 130 of the comparative example, which has a site with a relatively low magnetic flux density in the q-axis magnetic path, is still not utilized effectively. In view of this, in the present embodiment, the radially inner wall surfaces 33a, 34a of the flux barriers 33, 34 are broadened to be closer to the adjacent magnetic pole regions than the positions along the q-axis magnetic path. This allows the d-axis inductance Ld to be reduced with a limited change in the q-axis inductance Lq, so that the saliency ratio (Lq/Ld) is increased.

(2) The radially inner wall surfaces 33a, 34a of the flux barriers 33, 34 have portions in parallel with the boundaries Bm between the magnetic pole regions. This allows the d-axis inductance Ld to be reduced with a further limited change in the q-axis inductance Lq, so that the saliency ratio (Lq/Ld) is increased.

(3) The flux barriers 33, 34 are located at the radially innermost positions among the flux barriers 33, 34, 35, 36, which are arranged in the radial direction. This allows the d-axis inductance Ld to be reduced with a limited change in the q-axis inductance Lq, so that the saliency ratio (Lq/Ld) can be increased. That is, while the magnetic path widths W1, W2 in FIG. 2A are set to be constant, the radially innermost magnetic path width W3 has a relatively low magnetic flux density as shown in FIG. 12, so that the radially innermost flux barriers 33, 34 can be broadened further inward.

(4) The rotor core 30 has the cutout 37 in a portion of the outer circumferential surface through which the d-axis extends. The cutout 37 extends in the axial direction of the rotor core 30. This allows the d-axis inductance Ld to be reduced with a limited change in the q-axis inductance Lq, so that the saliency ratio (Lq/Ld) and therefore the reluctance torque is increased.

(5) The rotor core 30 includes the permanent magnets 40, 41 embedded therein. This also allows the d-axis inductance Ld to be reduced with a limited change in the q-axis inductance Lq, so that the saliency ratio (Lq/Ld) is increased.

(6) Since the rotor core 30 is constituted by the stacked magnetic steel plates 60 and has the welded portion 38 at the cutout 37 to join the magnetic steel plates 60, it is possible to fix the magnetic steel plates 60 without blocking the magnetic path in the rotor 20.

Specifically, in the case where substantially the entire rotor core 30 is utilized as a magnetic path as in the rotor 20 of the present embodiment, providing a swaged portion would cause significant performance (e.g. torque) reduction. In addition, only providing a swaged portion in an inner peripheral portion not utilized as a magnetic path in the rotor core (i.e. a portion with a low magnetic flux density) would not reliably provide a sufficient joint strength.

In the present embodiment, the welded portion 38 (joint portion) is provided at the cutout 37 in the outer circumferential surface of the rotor core 30 to allow for fixation between the magnetic steel plates 60 without blocking any magnetic path in the rotor core 30 (without adversely affecting the magnetic performance). Also, in the present embodiment, the magnetic steel plates 60 are fixed to an outer peripheral portion of the rotor core 30 compared to the case where the magnetic steel plates are fixed by, for example, swaging in an inner peripheral portion of the rotor core. It is therefore possible to have a high joint strength, and a problem is less likely to occur that some of the steel plates 60 are opened in the axial direction of the rotor core 30 in an outer peripheral portion of the rotor core 30. Further, the stator core 101 is constituted by stacked magnetic steel plates, which are fixed by welding at a cutout provided in the outer circumferential surface of the stator core 101. The rotor core 30 can be fabricated in the same facility (welding machine) as used in the welding process for the stator core 101. In the present embodiment, there is no need to provide a new swaging die, resulting in a very small cost increase to have a cost advantage.

(7) As shown in FIG. 5, the flux barriers 33, 34, 35, 36 are included in the inner flux barrier layer (33, 34) arranged radially inward and the outer flux barrier layer (35, 36) arranged to be separated radially outward from the inner flux barrier layer (33, 34). The inner flux barrier layer (33, 34) and the outer flux barrier layer (35, 36) each have a shape symmetrical with respect to the d-axis. The rotor core 30 has the cutout 37 in a portion of the outer circumferential surface of the rotor core 30 through which the d-axis extends. The cutout 37 extends in the axial direction of the rotor core 30 and is symmetrical with respect to the d-axis. The angle θr of the rotor core 30 of each pole, the angle θa between the d-axis and one of the circumferential ends of the cutout 37, the angle θb between the d-axis and the circumferential ends of the radially outer wall surfaces 35b, 36b of the outer flux barrier layer (35, 36), and the angle θc between the d-axis and the circumferential ends of the radially outer wall surfaces 33b, 34b of the inner flux barrier layer (33, 34) satisfy the following expressions.

$0.12 \leq \theta a/\theta r \leq 0.14$ $0.26 \leq \theta b/\theta r \leq 0.29$ $0.40 \leq \theta c/\theta r \leq 0.42$ This allows the torque ripple to be reduced by optimally arranging the flux barriers 33, 34, 35, 36 and the cutout 37.

The present invention is not limited to the above described embodiment, but may be embodied as follows, for example.

Instead of fixing the magnetic steel plates 60 with the welded portion 38 shown in FIGS. 1, 2A, and 2B, alternative means may be used to fix the magnetic steel plates 60 so that no such welded portion 38 exists within the cutout 37.

Figures 13A, 13B:
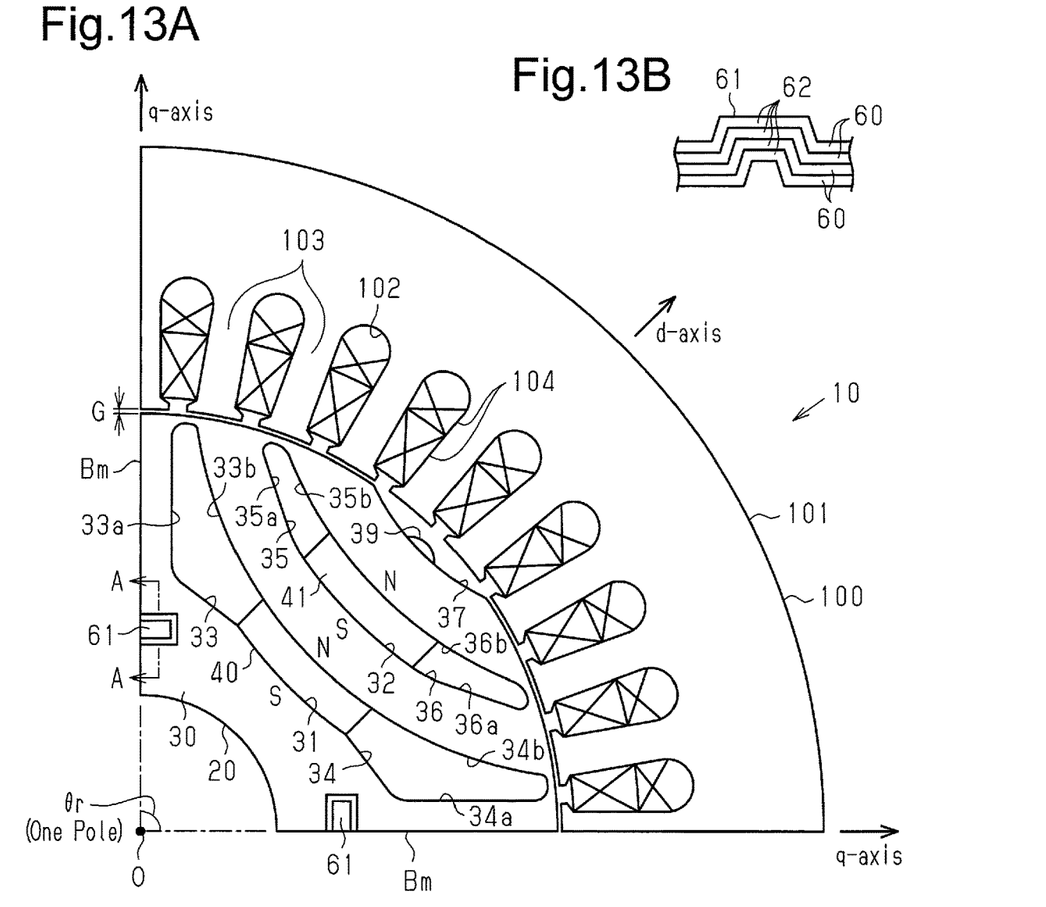
FIG. 13A is a partially enlarged view of a rotating electrical machine according to another example.
FIG. 13B is a schematic cross-sectional view taken along line A-A in FIG. 13A.

As shown in FIG. 13A in place of FIG. 2A, the rotor core 30 may have an adhesive portion 39 at the cutout 37 to join the magnetic steel plates 60. In a common rotor core, for fixation between stacked magnetic steel plates, a swaged portion is provided within the steel plates and the steel plates are sandwiched between retainer plates. In this case, the swaged portion, which is required to be arranged within the magnetic path in the rotor core, distorts the steel plates and worsens the magnetic performance. Therefore, the torque may, for example, be reduced depending on the arrangement of such a swaged portion. In the example shown in FIG. 13A, since the magnetic steel plates 60 are adhesively fixed, torque loss and the like due to the arrangement of such a swaged portion can be prevented (or reduced).

Specifically, the rotor core 30 shown in FIG. 13A has a cutout (large groove) 37 in the outer circumferential surface thereof. The cutout (space) 37 is utilized for formation of the adhesive portion 39, which is used to fix the magnetic steel plates 60, as shown in FIG. 13A. Since the sufficiently large cutout (outer peripheral groove) 37 is provided, the adhesive portion 39 does not protrude radially outward from the rotor core 30, so that the rotor 20 is not increased in size. The number of sites to form such an adhesive portion 39 is not limited to one per one cutout 37. For example, two adhesive portions 39 may be provided per one cutout 37. The type of adhesive is also not limited.

Further, as shown in FIG. 13A, the rotor core 30 may have a swaged portion 61 in an inner peripheral portion. As shown in FIG. 13B, the swaged portion 61 is provided by stacking and pressurizing magnetic steel plates 60 with a rectangular protrusion 62 provided therein, after which the protrusions 62 of the magnetic steel plates 60 are fixed by plastic deformation of the metal.

In the case where substantially the entire rotor core 30 is utilized as a magnetic path as in the rotor 20 of this example, providing a swaged portion would cause significant performance (e.g. torque) reduction. In addition, only providing a swaged portion in an inner peripheral portion not utilized as a magnetic path (i.e. a portion with a low magnetic flux density) would not reliably provide a sufficient joint strength. Applying adhesive to the cutout (cutout 37 in the outer circumferential surface of the rotor core 30) allows for selection of an adhesive independent of the viscosity. That is, only low-viscosity adhesives have conventionally been selected because it has been necessary to cause such a low-viscosity adhesive to penetrate between the magnetic steel plates of the rotor core to prevent radially outward bulge (protrusion) on the outer circumferential surface of the cylindrical rotor core (to prevent the adhesive from remaining there). In contrast, since the present embodiment utilizes the cutout 37, it is possible to avoid the adhesive applied to the cutout 37, even if it bulges, protruding radially outward from the rotor core 30. In addition, since the fixation is provided in an outer peripheral portion of the rotor core 30, it is possible to have a higher joint strength than the fixation in an inner peripheral portion of the rotor core 30, and a problem is less likely to occur that some of the steel plates are opened in the axial direction of the rotor core 30 in an outer peripheral portion of the rotor core 30.

Since the rotor core 30 has the adhesive portion 39 at the cutout 37, it is possible to fix the magnetic steel plates 60 without blocking the magnetic path in the rotor 20. The rotor core 30 can also be fabricated through only one drying process in the same facilities (common adhesive drying furnace for the permanent magnets and the rotor core) as used in the adhesive process for the permanent magnets 40, 41 to the rotor core 30, resulting in a very small cost increase to have a cost advantage.

In the example shown in FIG. 13A, although the magnetic steel plates 60, which are fixed by the adhesive portion 39 and the swaged portions 61, they may be fixed only by the adhesive portion 39.

Although the flux barrier layers and the permanent magnets 40, 41, which are arranged, respectively, in two layers in the radial direction, they may be arranged in any number of layers, e.g., three layers.

The permanent magnets 40, 41 may be omitted. That is, the present invention may be applied to a reluctance motor. In this case, the slit including the permanent magnet insertion hole 31 and the flux barriers 33, 34 continuing therefrom in FIGS. 1 and 2A forms a flux barrier, while the slit including the permanent magnet insertion hole 32 and the flux barriers 35, 36 continuing therefrom in the same figures forms another flux barrier.

The number of poles of the rotating electrical machine is not limited to four, but may be greater or smaller than four, specifically, e.g., six.

DESCRIPTION OF THE REFERENCE NUMERALS

10 ... Rotating electrical machine; 20 ... Rotor; 30 ... Rotor core; 33, 34, 35, 36 ... Flux barriers; 33a, 34a ... Radially inner wall surfaces; 33b, 34b, 35b, 36b ... Radially outer wall surfaces; 37 ... Cutout; 38 ... Welded portion; 39 ... Adhesive portion; 40, 41 ... Permanent magnets; 60 ... Magnetic steel plate; 100 ... Stator; 104 ... Coil; G ... Gap; Bm ... Boundary between magnetic pole regions.

The invention claimed is:

1. A rotor for a rotating electrical machine comprising a cylindrical rotor core configured to be arranged radially inside of a stator with a coil wound therearound, wherein
an outer circumferential surface of the rotor core is opposed to the stator with a gap therebetween,
the rotor core has a plurality of magnetic pole regions in a circumferential direction and also has, in each of the plurality of magnetic pole regions, a plurality of flux barriers extending along a q-axis magnetic path,
the plurality of flux barriers has a radially outer wall surface and a radially inner wall surface,
the radially inner wall surface is broadened to be closer to the adjacent magnetic pole region than a position along the q-axis magnetic path, wherein
each of the plurality of flux barriers is included in a plurality of flux barrier layers arranged in a radial direction,
the plurality of flux barrier layers include an inner flux barrier layer and an outer flux barrier layer arranged to be separated radially outward from the inner flux barrier layer,
the inner flux barrier layer and the outer flux barrier layer each have a shape symmetrical with respect to a d-axis,
the rotor core has a cutout in a portion of the outer circumferential surface through which the d-axis extends,
the cutout extends in an axial direction of the rotor core and is symmetrical with respect to the d-axis, and
the rotor core is configured to satisfy the following expressions:

$$0.12 \le \theta a/\theta r \le 0.14$$

$$0.26 \le \theta b/\theta r \le 0.29$$

$$0.40 \le \theta c/\theta r \le 0.42$$

where
θr is an angle of each magnetic pole region,
θa is an angle between the d-axis and one of circumferential ends of the cutout,
θb is an angle between the d-axis and one of circumferential ends of the radially outer wall surface of the outer flux barrier layer, and
θc is an angle between the d-axis and one of circumferential ends of the radially outer wall surface of the inner flux barrier layer.

2. The rotor for a rotating electrical machine according to claim 1, wherein the rotor core is constituted by a plurality of stacked magnetic steel plates and has a welded portion or an adhesive portion at the cutout that joins the plurality of stacked magnetic steel plates together.

3. The rotor for a rotating electrical machine according to claim 1, wherein the plurality of flux barriers include a flux barrier that is located at radially innermost position among the plurality of flux barriers, the flux barrier that is located at the radially innermost position has a radially inner wall surface having a portion in parallel with a boundary between the plurality of magnetic pole regions.

4. The rotor for a rotating electrical machine according to claim 1, wherein each of the plurality of flux barriers has an arcuate shape.

5. The rotor for a rotating electrical machine according to claim 1, wherein the radially inner wall surface and the radially outer wall surface are curved.

6. The rotor for a rotating electrical machine according to claim 1, wherein the radially inner wall surface of each of the plurality of flux barriers has a portion in parallel with a boundary between the plurality of magnetic pole regions.

7. The rotor for a rotating electrical machine according to claim 1, wherein the plurality of flux barriers include a flux barrier that is a radially innermost one of the plurality of flux barrier layers arranged in the radial direction.

* * * * *